US010119424B2

(12) United States Patent
Karafillis et al.

(10) Patent No.: US 10,119,424 B2
(45) Date of Patent: Nov. 6, 2018

(54) ATTACHMENT ASSEMBLY AND GAS TURBINE ENGINE WITH ATTACHMENT ASSEMBLY

(71) Applicant: General Electric Company, Schenectady, NY (US)

(72) Inventors: Apostolos Pavlos Karafillis, Winchester, MA (US); Christopher Dale Mathias, Cincinnati, OH (US); Kyle Earl Roland Henry, Seabrook, NH (US); Dylan James Fitzpatrick, Peabody, MA (US); Dennis Robert Jonassen, Liberty Township, OH (US); Paul W. Donahue, Falmouth, MA (US)

(73) Assignee: General Electric Company, schenectady, NY (US)

( * ) Notice: Subject to any disclaimer, the term of this patent is extended or adjusted under 35 U.S.C. 154(b) by 358 days.

(21) Appl. No.: 14/707,704

(22) Filed: May 8, 2015

(65) Prior Publication Data

US 2016/0326911 A1  Nov. 10, 2016

(51) Int. Cl.
*F01D 25/00* (2006.01)
*F01D 25/28* (2006.01)
(Continued)

(52) U.S. Cl.
CPC ........... *F01D 25/28* (2013.01); *F01D 25/005* (2013.01); *F01D 25/12* (2013.01); *F02C 7/20* (2013.01);
(Continued)

(58) Field of Classification Search
None
See application file for complete search history.

(56) References Cited

U.S. PATENT DOCUMENTS 4,296,586 A * 10/1981 Heurteux ............. F16B 5/01
411/338
4,792,475 A * 12/1988 Bien .................. B62D 29/048
403/408.1
(Continued)

FOREIGN PATENT DOCUMENTS

EP 0011026 A1 5/1980
EP 0561590 A1 9/1993
(Continued)

OTHER PUBLICATIONS

European Search report and Written Opinion issued in connection with corresponding EP Application No. 16168190.3 dated Sep. 15, 2016.

*Primary Examiner* — Igor Kershteyn
*Assistant Examiner* — Theodore Ribadeneyra
(74) *Attorney, Agent, or Firm* — General Electric Company; William Andes

(57) ABSTRACT

An attachment assembly for attaching a center structure to an outer structure at least partially circumscribing the center structure, the attachment assembly having a bushing provided within the center structure or the outer structure, the bushing defining a first through passage, a bushing adapter slidably mounted within the first through passage and defining a second through passage, a threaded passage provided on the other of the center structure or the outer structure and a bolt passing through the first through passage and the second through passage and threaded into the threaded passage.

16 Claims, 6 Drawing Sheets

(51) Int. Cl.
*F02K 1/04* (2006.01)
*F02C 7/20* (2006.01)
*F01D 25/12* (2006.01)
*F16B 39/282* (2006.01)

(52) U.S. Cl.
CPC .............. *F02K 1/04* (2013.01); *F16B 39/282* (2013.01); *F05D 2220/32* (2013.01); *F05D 2240/90* (2013.01); *F05D 2260/31* (2013.01); *F05D 2300/6033* (2013.01); *Y02T 50/672* (2013.01)

(56) References Cited

U.S. PATENT DOCUMENTS

| | | | |
|---|---|---|---|
| 5,013,199 A * | 5/1991 | Downes | F16B 31/04 267/161 |
| 5,249,877 A | 10/1993 | Corsmeier | |
| 5,275,529 A * | 1/1994 | Langenbrunner | F02C 7/045 244/132 |
| 5,375,420 A | 12/1994 | Falls et al. | |
| 8,424,312 B2 | 4/2013 | Conete et al. | |
| 8,590,316 B2 | 11/2013 | Conete et al. | |
| 2003/0091788 A1 | 5/2003 | Schroder et al. | |
| 2007/0009349 A1* | 1/2007 | Ward, Jr. | F01D 9/04 415/115 |
| 2007/0280822 A1* | 12/2007 | Frost | F02K 1/80 415/170.1 |
| 2009/0010755 A1 | 1/2009 | Keller et al. | |
| 2009/0178262 A1* | 7/2009 | Reid | B21J 15/022 29/263 |
| 2010/0263194 A1 | 10/2010 | Morrison et al. | |
| 2011/0111211 A1 | 5/2011 | Golecki | |
| 2011/0271684 A1 | 11/2011 | Corsmeier et al. | |
| 2012/0263582 A1 | 10/2012 | Foster et al. | |
| 2013/0202450 A1* | 8/2013 | Ivakitch | F16D 1/076 416/248 |
| 2014/0003880 A1 | 1/2014 | Grooms, II | |
| 2014/0147266 A1 | 5/2014 | Kramer | |

FOREIGN PATENT DOCUMENTS

| | | |
|---|---|---|
| EP | 2607632 A2 | 6/2013 |
| WO | 2014058502 A2 | 4/2014 |

* cited by examiner

ATTACHMENT ASSEMBLY AND GAS TURBINE ENGINE WITH ATTACHMENT ASSEMBLY

BACKGROUND OF THE INVENTION

Turbine engines, and particularly gas or combustion turbine engines, are rotary engines that extract energy from a flow of combusted gases passing through the engine onto a multitude of turbine blades. Exhaust from combustion flows through a high pressure turbine and a low pressure turbine prior to leaving the turbine engine through an exhaust nozzle. Exhaust within and leaving the exhaust nozzle is at extremely high temperatures. The exhaust transfers heat to the components of the turbine engine, including the exhaust nozzle. As the components of the turbine engine absorb heat from the exhaust, the heat signature of the turbine engine is increased. It is beneficial to use components that can withstand such heat.

BRIEF DESCRIPTION OF THE INVENTION

In one aspect, an embodiment of the invention relates to an attachment assembly for attaching a center structure to an outer structure at least partially circumscribing the center structure, the attachment assembly having a bushing provided within the center structure or the outer structure, the bushing defining a first through passage, a bushing adapter slidably mounted within the first through passage and defining a second through passage, a threaded passage provided on the other of the center structure or the outer structure and a bolt having a head and a shank with a threaded portion wherein the bolt passes through the first through passage and the second through passage, with the head abutting the bushing adapter and the threaded portion threaded into the threaded passage.

In another aspect, an embodiment of the invention relates to a gas turbine engine, having a centerbody a support structure circumscribing the centerbody and an attachment assembly for operably coupling the centerbody to the support structure and configured to allow a cooling air flow to the centerbody where the attachment assembly includes a bushing provided on the centerbody or the support structure, the bushing defining a first through passage, a bushing adapter slidably mounted within the first through passage and defining a second through passage, a threaded passage provided on the other of the centerbody or the support structure and a bolt having a head and a shank with a threaded portion wherein the bolt passes through the first through passage and the second through passage, with the head abutting the bushing adapter and the threaded portion threaded into the threaded passage.

DESCRIPTION OF EMBODIMENTS OF THE INVENTION

Figure 1:
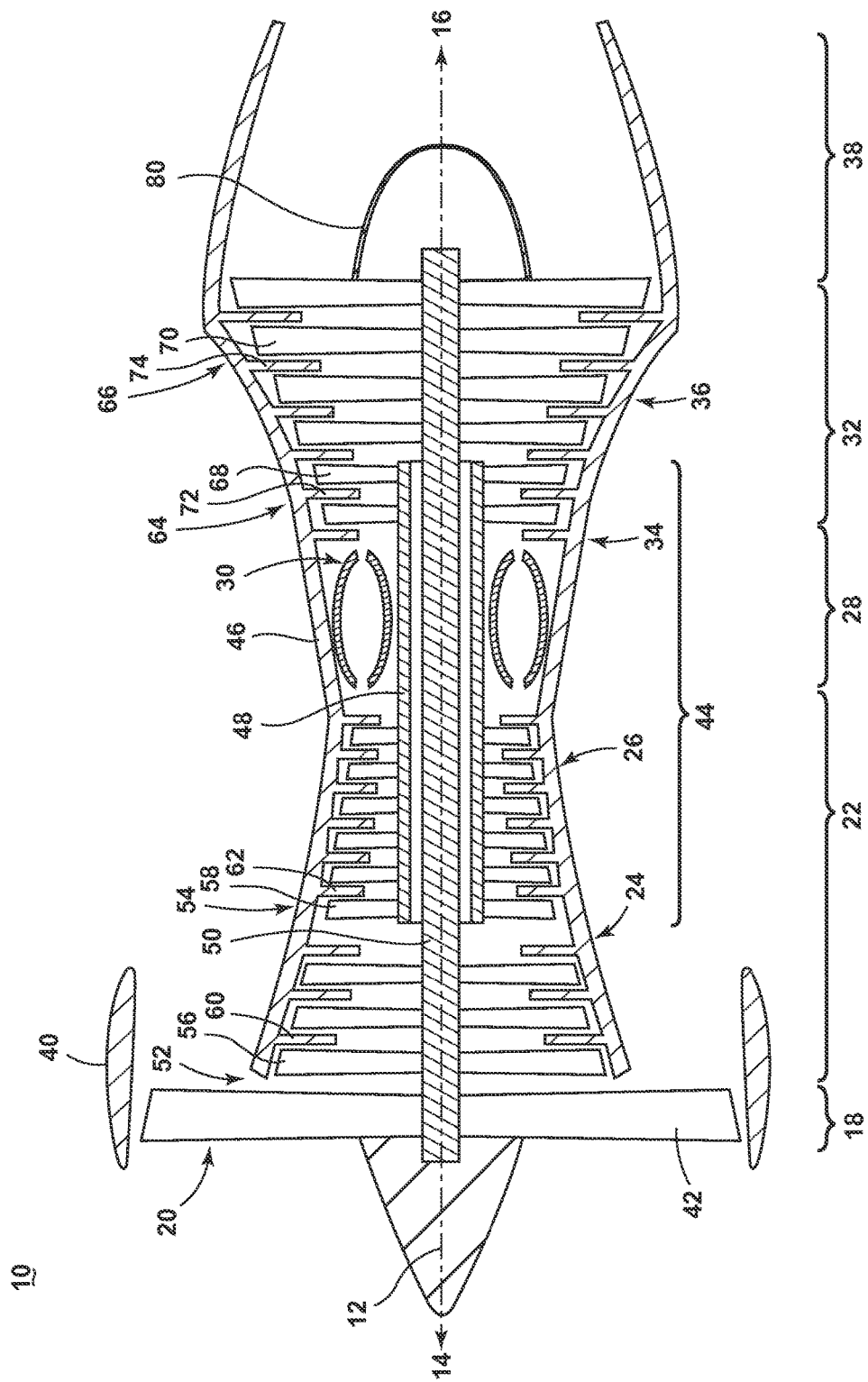
FIG. 1 is a schematic cross-sectional diagram of a gas turbine engine for an aircraft.

Embodiments of the invention relate to an attachment assembly for use in a gas turbine engine. For purposes of explaining the environment of embodiments of the invention, FIG. 1 illustrates an exemplary gas turbine engine 10 for an aircraft forming an environment for the attachment assembly. It will be understood that the principles described herein are equally applicable to turboprop, turbojet, and turbofan engines, as well as turbine engines used for other vehicles or in stationary applications. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by a core casing 46, which can be coupled with the fan casing 40. A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70.

A center structure in the form of a centerbody 80 is mounted to the low pressure turbine section. The centerbody 80 is included in the exhaust section 38 and is utilized to minimize the turbulence produced in the exhaust gas within the exhaust sections 38.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in combustor 30 and ignited, thereby generating combustion gases. The combustion gases are discharged into the HP turbine 34, which extracts work from these gases to drive the HP compressor 26. The combustion gases are then discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
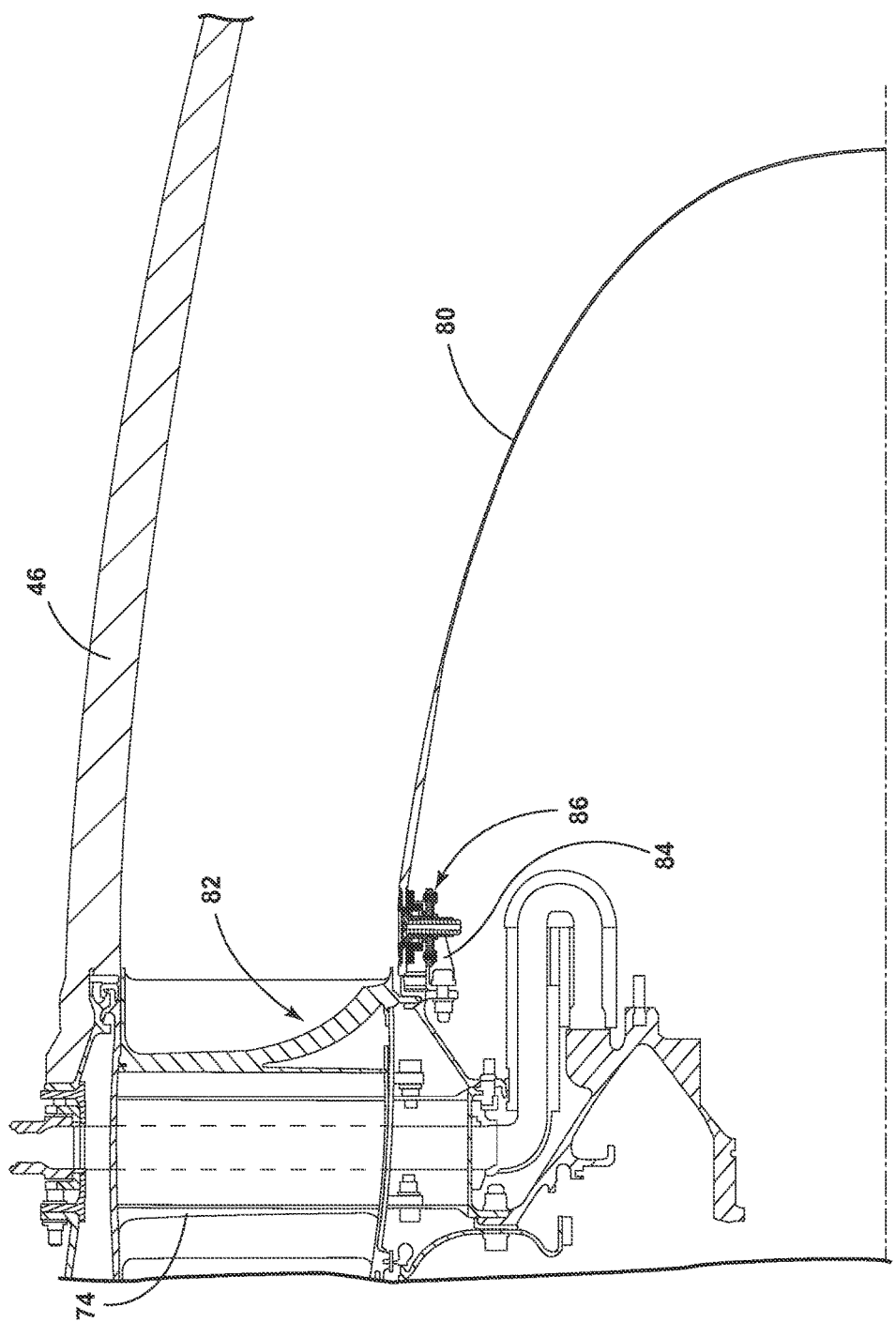
FIG. 2 is a cross-sectional view of a portion of the gas turbine engine of FIG. 1 including an attachment assembly according to an embodiment of the invention.

FIG. 2 illustrates details of the mounting of the centerbody 80 to a support structure 82 of the turbine section 32. The centerbody 80 can be formed from any suitable material including, but not limited to, a ceramic matrix composite. As the centerbody 80 faces high temperatures within the exhaust section the material should be suitable for such high temperatures.

The support structure 82 can be any suitable structure for operably coupling the centerbody 80 to the remainder of the gas turbine engine 10 including, but not limited to, the core casing 46. In the illustrated example, of FIG. 2, the support structure can include a turbine exhaust frame of the gas turbine engine 10 that supports the HP turbine vanes 74 of FIG. 1. In the illustrated example, the centerbody 80 is attached to a bracket 84 of the support structure 82 via an attachment assembly 86.

Figure 3:
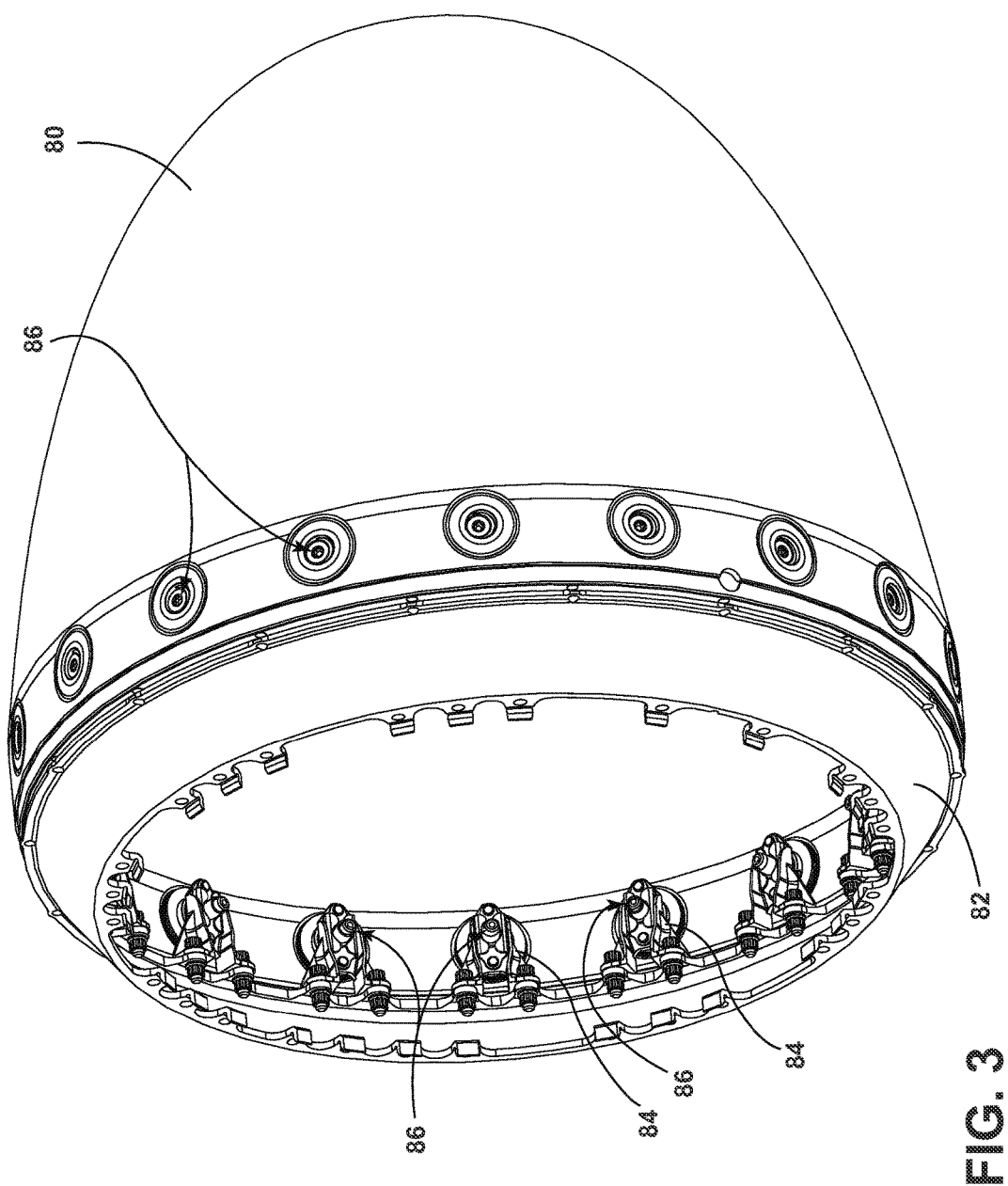
FIG. 3 is a perspective view of a centerbody and support structure illustrated in FIG. 2 including multiple attachment assemblies according to an embodiment of the invention.

As better illustrated in FIG. 3, the support structure 82 can circumscribe the centerbody 80 and a plurality of attachment assemblies 86 can be utilized to mount the centerbody 80 to the support structure 82. The plurality of attachment assemblies 86 can be circumferentially spaced about the centerbody 80 and support structure 82.

Figure 4:
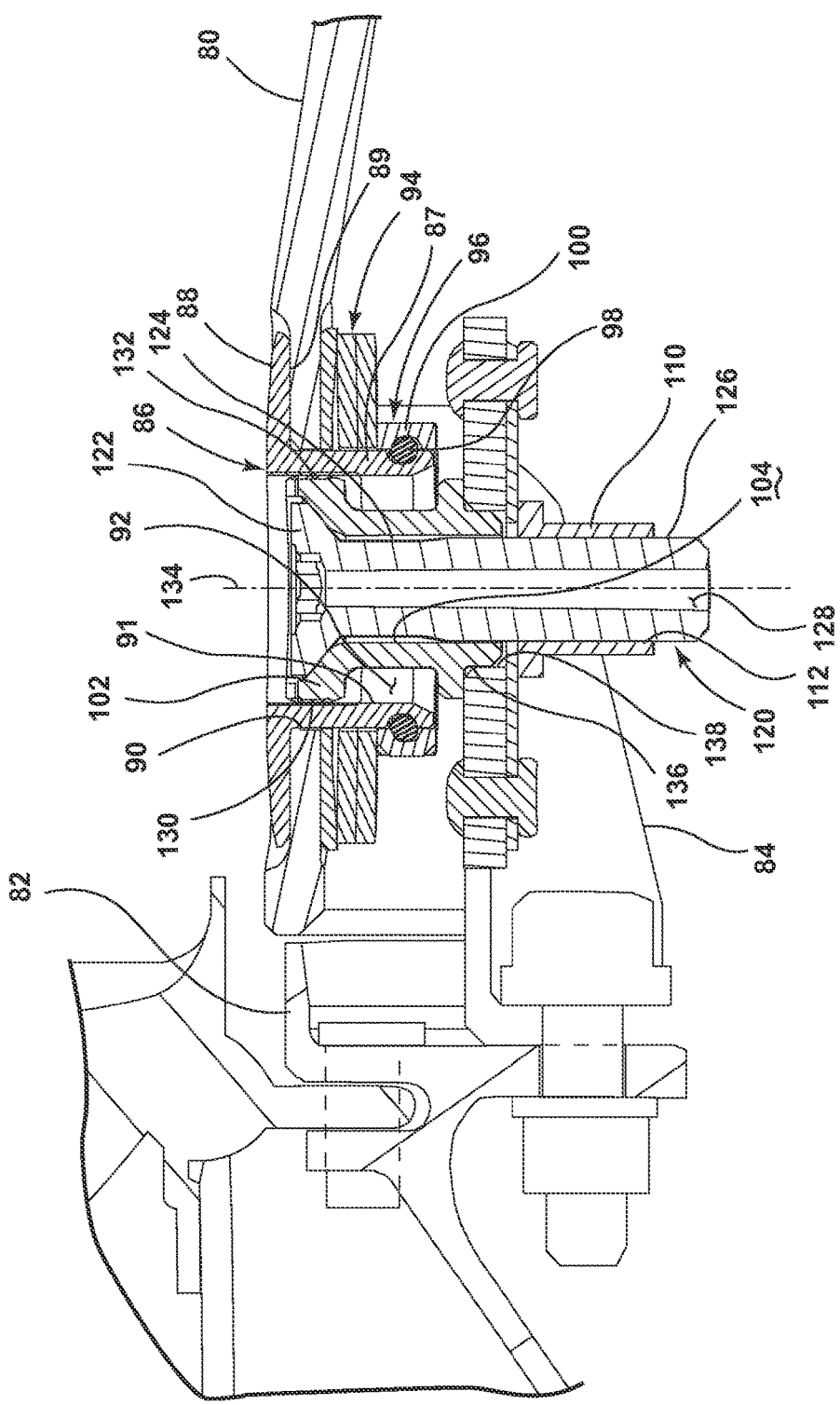
FIG. 4 is a cross-sectional view of portions of the centerbody and support structure and the attachment assembly of FIG. 2.

FIG. 4 shows an enlarged view of the attachment assembly 86 and how it operably couples the centerbody 80 to the bracket 84 attached to the support structure 82. The bracket 84 can be integrally formed with a portion of the support structure 82 or can be bolted onto a portion of the support structure as illustrated. Regardless, the bracket 84 can be formed from a stiff material to limit deflection.

A bushing 88 is illustrated as being provided within an opening 90 in the center body 80. The bushing 88 can include a cylindrical body 87 that terminates in a shoulder 89, which forms a stop, and an internal portion 91 that can define a first through passage 92. In the illustrated example, washer(s) 94 and a fastener 96 are utilized to clamp the bushing 88 against the centerbody 80. The washer(s) 94 can be any suitable washer(s) including belleville washers. The washer(s) 94 can control the clamp load on the centerbody 80 at a minimum design intent value that takes into account dimensional stack-up and thermal growth of the clamping and clamped elements. While any suitable fastener 96 can be utilized, the fastener has been illustrated as including a wire 98 and wire collar 100. Alternatively, the fastener 96 can include a threaded nut. In such an instance, the bushing 88 would include a threaded portion and the threaded nut would thread on the bushing 88 until it hit a mechanical stop on bushing 88 in order to control compression of the washer(s) 94.

A bushing adapter 102 can be slidably mounted within the first through passage 92 defined by the bushing 88. The bushing adapter 102 can define a second through passage 104.

A threaded passage 112 is illustrated as being provided on the support structure 82 and can be included in the attachment assembly 86. More specifically, a nut 110 is illustrated as being mounted on the bracket 84 and the nut 110 includes a threaded opening forming the threaded passage 112. The nut 110 can be mounted to the bracket 84 in any suitable manner including, but not limited to, the nut 110 riveted to the bracket 84.

A bolt 120 having a head 122 and a shank 124 with a threaded portion 126 can also be included in the attachment assembly 86. The bolt 120 can pass through both the first through passage 92 and the second through passage 104. The head 122 of the bolt 120 abuts the bushing adapter 102 and the threaded portion 126 threads into the threaded opening 112 of the nut 110 to constrain or secure the centerbody 80 to the support structure 82. As illustrated, the bolt 120 can also include a third through passage 128 extending through its length. The third through passage 128 defines a fluid path from an interior of the center structure 80 to an exterior of the center body 80 including to the support structure 82.

It will be understood that the attachment assembly 86 can be formed in any manner of suitable ways to operably couple the centerbody 80 to the support structure 82. In one embodiment, the internal portion 91 of the bushing 88 can be cylindrical and the bushing adapter 102 can have an annular shoulder 130 with at least a partially rounded cross section that enables a swivel joint between the bushing 88 and the bushing adapter 102. This enables a swivel joint between the bushing 88 and the bushing adapter 102. As the attachment assembly 86 can be utilized on a gas turbine engine 10 with a variable exhaust nozzle that can cause a high plug load in the AFT direction during a failed open nozzle condition, the attachment assembly can transfer this plug load to the support structure 82, without imparting overturning moments at each bushing 88, due to the swivel joint between the bushing 88 and bushing adapter 102.

Figure 5:
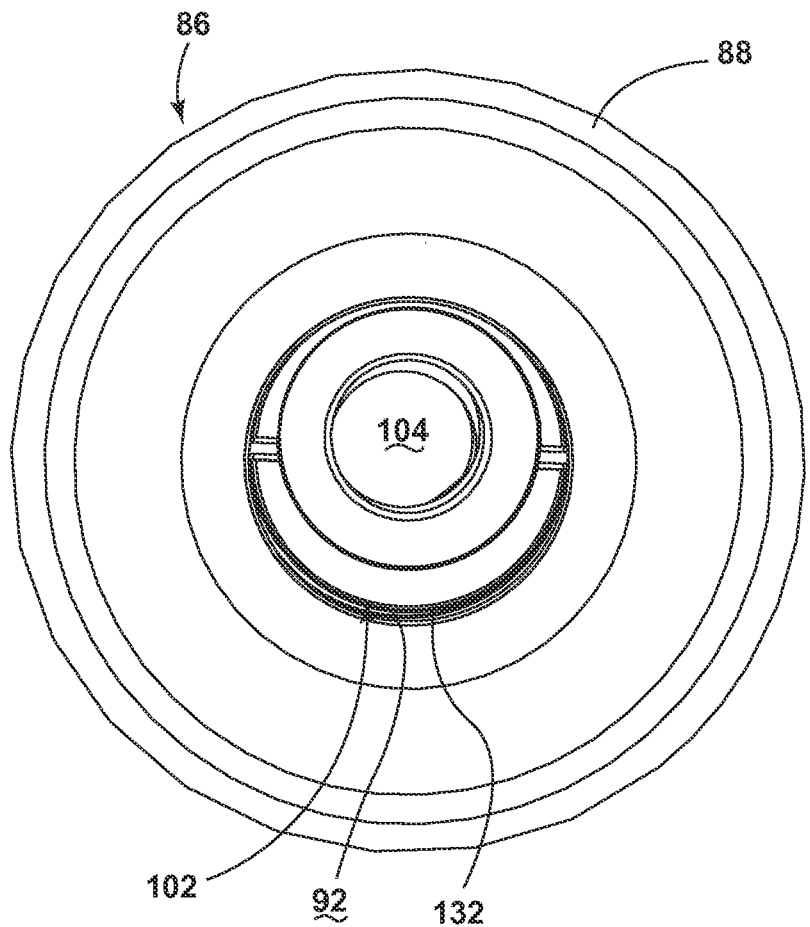
FIG. 5 is a top view of a portion of the attachment assembly in FIG. 4.

In one embodiment, an upper diameter 132 of the bushing adapter 102 can be eccentric, with a radial eccentricity of 0.025 inches. FIG. 5 is a top view of the attachment assembly 86, which better shows the eccentricity of the bushing adapter 102. The bolt 120 has been removed to better illustrate that the upper diameter 132 of the bushing adapter is eccentric.

Referring back to FIG. 4, other features of the bushing adapter 102, including for example all other features of the bushing adapter 102 can be concentric to an axis 134 of the bolt 120. The clearance between the upper diameter 132 of the bushing adapter 102 and the diameter of the internal portion 91 of the bushing 88 can be very small. By way of non-limiting example, the clearance can be about 0.003 inches. The clearance between a protrusion 136 of the bushing adapter 102 and a circumferential slot 138 of the bracket 84 can be of the same magnitude. The bushing adapter eccentricity can be used to enable adjustment of the axial position of the centerbody 80, while accommodating the position tolerances of the various features of the attachment assembly 86. This can include that shims (not shown) of a known thickness can be used to set the axial distance between the forward end of the centerbody 80 and the aft end of the support structure 82. After the centerbody 80 is positioned axially, the bushing adapters 102 can be inserted into position. If all the openings are in their theoretical position, no adjustment is needed. If some openings are out of position within their manufacturing tolerances, then the bushing adapter 102 can be turned about its bolt centerline such that it is translated circumferentially in the circumferential slot 138 of the bracket 84. These adjustments enable the bushing adapter 102 to engage with both the internal portion 91 of the bushing 88 and with the circumferential slot 138 of the bracket 84.

Alternatively, the bushing adapter 102 can have an upper diameter 132 that is concentric with the other features of the bushing adapter 102. In such an instance, the slot 138 of the bracket 84 can be modified to have a small clearance opening while some of the other brackets of the multiple attachment assemblies 86 have large clearance holes. This alternative, does not allow any adjustment of the axial position of the centerbody 80, but assembly becomes easier because an installer only has to drop the bushing adapters 102 in place with no additional adjustments. In such an instance, the bushing adapter 102 and the bolt 122 may be formed as a single part.

Figure 6:
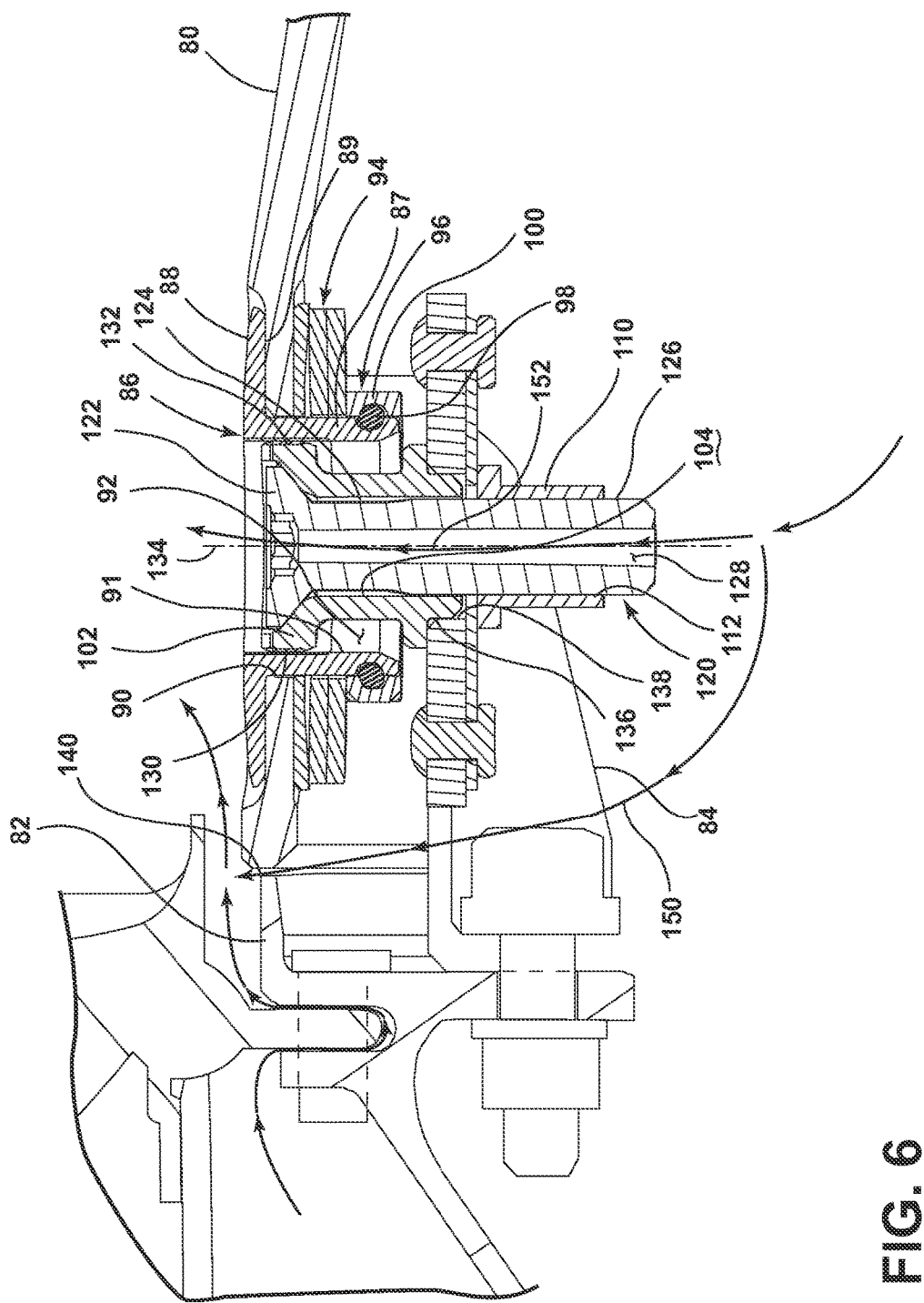
FIG. 6 illustrates airflow through the portions of the centerbody and support structure and the attachment assembly shown in FIG. 4.

As illustrated more clearly in FIG. 6, a controlled gap 140 is located between the centerbody 80 and a portion of the support structure 82. Airflows that provide cooling flow, such as compressor bleed air, for the attachment assembly 86 have been illustrated with arrows. One airflow 150 flows through the gap 140 between the support structure 82 and the centerbody 80. Another airflow 152 flows along the third through passage within the bolt 120.

The above described embodiments provide for a variety of benefits including the attachment assembly allows differential thermal growth between the support structure and the centerbody. A further benefit provided is that the attachment assembly meters cooling flow by allowing a controlled gap between the forward end of the centerbody and the mating features of the support structure and the bolts of the assemblies include a cylindrical cooling passage along their length. This allows for cooling of the attachment assembly itself as well as allows for cooling of the centerbody. This results in advantages such as the ability to operate in higher temperature environments than typical metal designs while minimizing necessary cooling flows and weight.

Prior centerbody designs used flexible brackets bolted on bushings on the centerbody and would not be capable of being utilized in environments that operate in high temperatures that require hardware cooling. The above-described embodiments can also withstand high plug loads as opposed to conventional flexible bracket attachments that either fail themselves or transfer high overturning moments to bushings attached to the centerbody. The above described embodiments can also include a swivel joint between the bushing adapters and the bushings. Further still, conventional centerbody designs are traditionally metal designs and the above described embodiments allow for a ceramic matrix composite material to be utilized, which allows for the advantages that come along with that material system including weight reductions.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure. Further still, while embodiments of the invention have been described as being in an environment of the gas turbine engine 10 it will be understood that the attachment assembly may be utilized for attaching any suitable center structure to an outer structure at least partially circumscribing the center structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An attachment assembly for attaching a center structure to an outer structure at least partially circumscribing the center structure, the attachment assembly comprising:
   a bushing provided within the center structure or the outer structure, the bushing defining a first through passage;
   a bushing adapter slidably mounted within the first through passage and defining a second through passage;
   a threaded passage provided on the other of the center structure or the outer structure; and
   a bolt having a head and a shank with a threaded portion wherein the bolt passes through the first through passage and the second through passage, with the head abutting the bushing adapter and the threaded portion threaded into the threaded passage,
   wherein the bushing adapter is able to move along the length of the first through passage after the attachment assembly is fully assembled.

2. The attachment assembly according to claim 1, further comprising a belleville washer that clamps the bushing to the center structure.

3. The attachment assembly of claim 1 wherein the bolt further comprises a third through passage extending through its length and the third through passage defines a fluid path from the center structure to the outer structure.

4. The attachment assembly of claim 1 wherein the bushing has a cylindrical body that terminates in a shoulder, which forms a stop.

5. The attachment assembly of claim 1 wherein the bushing has a cylindrical internal portion.

6. The attachment assembly of claim 1, further comprising a nut having a threaded opening forming the threaded passage.

7. The attachment assembly of claim 1 wherein an upper portion of the bushing adapter is concentric with other features of the bushing adapter.

8. An attachment assembly for attaching a center structure to an outer structure at least partially circumscribing the center structure, the attachment assembly comprising:
   a bushing provided within the center structure or the outer structure, the bushing defining a first through passage;

a bushing adapter slidably mounted within the first through passage and defining a second through passage;

a threaded passage provided on the other of the center structure or the outer structure; and a bolt having a head and a shank with a threaded portion wherein the bolt passes through the first through passage and the second through passage, with the head abutting the bushing adapter and the threaded portion threaded into the threaded passage;

wherein the bushing adapter has an annular shoulder with a rounded surface that enables a swivel joint between the bushing and the bushing adapter.

9. An attachment assembly for attaching a center structure to an outer structure at least partially circumscribing the center structure, the attachment assembly comprising:

a bushing provided within the center structure or the outer structure, the bushing defining a first through passage;

a bushing adapter slidably mounted within the first through passage and defining a second through passage;

a threaded passage provided on the other of the center structure or the outer structure; and a bolt having a head and a shank with a threaded portion wherein the bolt passes through the first through passage and the second through passage, with the head abutting the bushing adapter and the threaded portion threaded into the threaded passage;

wherein an upper portion of the bushing adapter is eccentric and enables adjustment of an axial position of the center structure.

10. The attachment assembly of claim 9 wherein other features of the bushing adapter are concentric to an axis of the bolt.

11. A gas turbine engine, comprising:

a centerbody;

a support structure circumscribing the centerbody; and an attachment assembly for operably coupling the centerbody to the support structure and configured to allow a cooling air flow to the centerbody, comprising:

a bushing provided on the centerbody or the support structure, the bushing defining a first through passage;

a bushing adapter slidably mounted within the first through passage and defining a second through passage;

a threaded passage provided on the other of the centerbody or the support structure; and a bolt having a head and a shank with a threaded portion wherein the bolt passes through the first through passage and the second through passage, with the head abutting the bushing adapter and the threaded portion threaded into the threaded passage;

wherein the bushing adapter is able to move along the length of the first through passage after the attachment assembly is fully assembled.

12. The gas turbine engine of claim 11 wherein a plurality of attachment assemblies are circumferentially spaced about the centerbody and the support structure.

13. The gas turbine engine of claim 11 wherein the bolt further comprises a third through passage extending through its length.

14. The gas turbine engine of claim 11 wherein a controlled gap is located between the centerbody and a portion of the support structure.

15. The gas turbine engine of claim 11 wherein the support structure comprises an exhaust frame of the gas turbine engine.

16. The gas turbine engine of claim 11 wherein the centerbody is formed from a ceramic matrix composite.

* * * * *